(12) United States Patent
Lin et al.

(10) Patent No.: US 11,934,585 B2
(45) Date of Patent: Mar. 19, 2024

(54) METHOD FOR PERFORMING INTERACTIVE OPERATION UPON A STEREOSCOPIC IMAGE AND STEREOSCOPIC IMAGE DISPLAY SYSTEM

(71) Applicant: Lixel Inc., Taipei (TW)

(72) Inventors: Arvin Lin, Hsinchu (TW);
Yung-Cheng Cheng, Hsinchu (TW);
Chun-Hsiang Yang, Hsinchu (TW)

(73) Assignee: LIXEL INC., Taipei (TW)

( * ) Notice: Subject to any disclaimer, the term of this patent is extended or adjusted under 35 U.S.C. 154(b) by 0 days.

(21) Appl. No.: 17/676,659

(22) Filed: Feb. 21, 2022

(65) Prior Publication Data

US 2023/0168742 A1 Jun. 1, 2023

(30) Foreign Application Priority Data

Nov. 30, 2021 (TW) ................... 110144508

(51) Int. Cl.
| | |
|---|---|
| *G06F 3/01* | (2006.01) |
| *G06F 3/0346* | (2013.01) |
| *G06T 7/50* | (2017.01) |
| *G06T 7/70* | (2017.01) |
| *H04N 13/398* | (2018.01) |
| *G02B 30/56* | (2020.01) |

(52) U.S. Cl.
CPC .............. *G06F 3/017* (2013.01); *G06F 3/011* (2013.01); *G06F 3/0346* (2013.01); *G06T 7/50* (2017.01); *G06T 7/70* (2017.01); *H04N 13/398* (2018.05); *G02B 30/56* (2020.01); *G06T 2200/04* (2013.01); *G06T 2207/30196* (2013.01)

(58) Field of Classification Search
None
See application file for complete search history.

(56) References Cited

U.S. PATENT DOCUMENTS

| 9,237,338 B1 * | 1/2016 | Maguire, Jr. .......... G02B 30/27 |
| 11,751,972 B2 * | 9/2023 | Kamine ................. A61B 90/36 |
| | | 345/633 |

(Continued)

FOREIGN PATENT DOCUMENTS

| CN | 107483915 A | 12/2017 |
| JP | 2021136036 A | 9/2021 |
| TW | 202045983 A | 12/2020 |

*Primary Examiner* — Talha M Nawaz
(74) *Attorney, Agent, or Firm* — Li & Cai Intellectual Property (USA) Office

(57) ABSTRACT

A method for performing interactive operation upon a stereoscopic image and a stereoscopic image display system are provided. The stereoscopic image display system includes a stereoscopic display and a gesture sensor. In the method, the stereoscopic display displays the stereoscopic image, and the gesture sensor senses a gesture. A current gesture state is obtained. A previous state of the stereoscopic image and a previous gesture state are obtained. Stereo coordinate variations corresponding to the gesture can be calculated according to the current gesture state and the previous gesture state. New stereoscopic image data can be obtained according to the previous state of the stereoscopic image and the stereo coordinate variations corresponding to the gesture. The stereoscopic display is used to display a new stereoscopic image that is rendered from the new stereoscopic image data.

15 Claims, 16 Drawing Sheets

(56) References Cited

U.S. PATENT DOCUMENTS

| | | | |
|---|---|---|---|
| 2008/0019589 A1* | 1/2008 | Yoon | G06V 40/28 |
| | | | 382/165 |
| 2012/0120060 A1* | 5/2012 | Noda | H04N 13/128 |
| | | | 345/419 |
| 2012/0120061 A1* | 5/2012 | Noda | G06F 40/169 |
| | | | 345/419 |
| 2012/0120064 A1* | 5/2012 | Noda | H04N 13/398 |
| | | | 345/419 |
| 2013/0050260 A1* | 2/2013 | Reitan | G06T 19/006 |
| | | | 345/633 |
| 2013/0226758 A1* | 8/2013 | Reitan | G06Q 30/02 |
| | | | 705/35 |
| 2013/0232430 A1* | 9/2013 | Reitan | G09G 3/003 |
| | | | 715/765 |
| 2013/0249947 A1* | 9/2013 | Reitan | G06T 19/006 |
| | | | 345/633 |
| 2014/0063061 A1* | 3/2014 | Reitan | G09G 5/14 |
| | | | 345/633 |
| 2014/0317492 A1* | 10/2014 | Kwak | G06F 3/0488 |
| | | | 715/234 |
| 2017/0219838 A1* | 8/2017 | Yang | G02B 30/36 |
| 2019/0018364 A1* | 1/2019 | Kim | H04M 3/567 |
| 2021/0373671 A1* | 12/2021 | Yang | G02B 30/00 |

* cited by examiner

METHOD FOR PERFORMING INTERACTIVE OPERATION UPON A STEREOSCOPIC IMAGE AND STEREOSCOPIC IMAGE DISPLAY SYSTEM

CROSS-REFERENCE TO RELATED PATENT APPLICATION

This application claims the benefit of priority to Taiwan Patent Application No. 110144508, filed on Nov. 30, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to an interactive sensing technology, and more particularly to a method that allows a user to use gesture or an object to interact with a stereoscopic image and a stereoscopic image display system.

BACKGROUND OF THE DISCLOSURE

Most conventional stereoscopic displays use the principle of parallax by which two images with a displacement as viewed by both eyes of a user are combined in the brain, so that a stereoscopic image with a depth can be produced. The two images with a displacement are configured to be displayed on the stereoscopic display, and the user can wear a special device to enable viewing of the stereoscopic image when the two images are combined in the brain. The special device can be, for example, red-cyan glasses, polarized glasses, shutter glasses or even a head-mounted display that allows the two images displayed on the display to be projected onto the two eyes.

Further, a naked-eye stereoscopic display technology allows the images to be projected onto the two eyes via a specific optical element disposed on the display. The optical element can be a lens or a raster that allows the user to perceive the stereoscopic image without the need for a special optical device.

Currently, stereoscopic display technologies are technologies for flat displaying only, and technologies that allow the user to interact with the stereoscopic image are yet to be provided. One of the reasons that there is no interactive technology for the conventional stereoscopic display is that the conventional stereoscopic display technologies produce images that are combined as a virtual image in the brain, and the user is unable to directly interact with the virtual image.

SUMMARY OF THE DISCLOSURE

The present disclosure is related to a method for performing interactive operation upon a stereoscopic image and a stereoscopic image display system, which allow a user to interact with the stereoscopic image displayed on a stereoscopic image display by gesture. The user can perform a moving, a rotating or a zooming action with a gesture. Through a stereo coordinate transformation, stereo coordinate variations can be obtained from the gesture, so as to determine an interactive command A new stereoscopic image can be calculated by referring to a previous state of the stereoscopic image. In the method, an interactive effect with the stereoscopic image by gesture can be achieved.

In one embodiment of the present disclosure, main components of the stereoscopic image display system include the stereoscopic image display and a gesture sensor. The gesture sensor can be disposed at a side of the stereoscopic image display for establishing an effective sensing zone covering the stereoscopic image displayed by the stereoscopic image display. The gesture can be effectively performed within the effective sensing zone.

The stereoscopic image display system executes the method for performing the interactive operation upon the stereoscopic image. In the method, according to stereoscopic image data, the stereoscopic image display displays the stereoscopic image. The gesture sensor senses the gesture, so as to obtain a current gesture state. The stereoscopic image display system can simultaneously obtain the previous state of the stereoscopic image from a storage and a previous gesture state. A set of stereo coordinate variations can be calculated based on the current gesture state and the previous gesture state. New stereoscopic image data can be obtained according to the previous state of the stereoscopic image and the stereo coordinate variations corresponding to the gesture. After that, the stereoscopic image display displays the new stereoscopic image rendered from the new stereoscopic image data.

In one embodiment of the present disclosure, the gesture sensor is used to obtain an image and a depth map of a body part or a pointing device that is used to perform the gesture. Stereo coordinates of multiple critical positions of the gesture can be calculated according to the image and the depth map, and the stereo coordinate variations corresponding to the gesture can be obtained based on the previous gesture state.

When the gesture sensor is being operated, the gesture sensor can obtain depth information of the gesture by a time of flight detection technology, an acoustic detection technology, a binocular parallax detection technology, or a structured light detection technology, so as to form the depth map.

Thus, the stereo coordinate variations corresponding to the gesture can be used to determine the interactive command, and the interactive command is a click command, a swipe command, a rotation command, or a zoom command.

Further, the previous state of the stereoscopic image and the stereo coordinate variations of the gesture are used to calculate gesture-movement data including a change of positions, a velocity, an acceleration and a change of size within a period of time, and by which the stereoscopic image display displays the new stereoscopic image during a change.

In one embodiment of the present disclosure, the stereoscopic image display system further includes a stereoscopic image server that can provide the stereoscopic image data. The stereoscopic image data is data provided for the stereoscopic image display to display the stereoscopic image. Further, the stereoscopic image server can obtain the new stereoscopic image data according to the previous state of the stereoscopic image and the stereo coordinate variations corresponding to the gesture.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
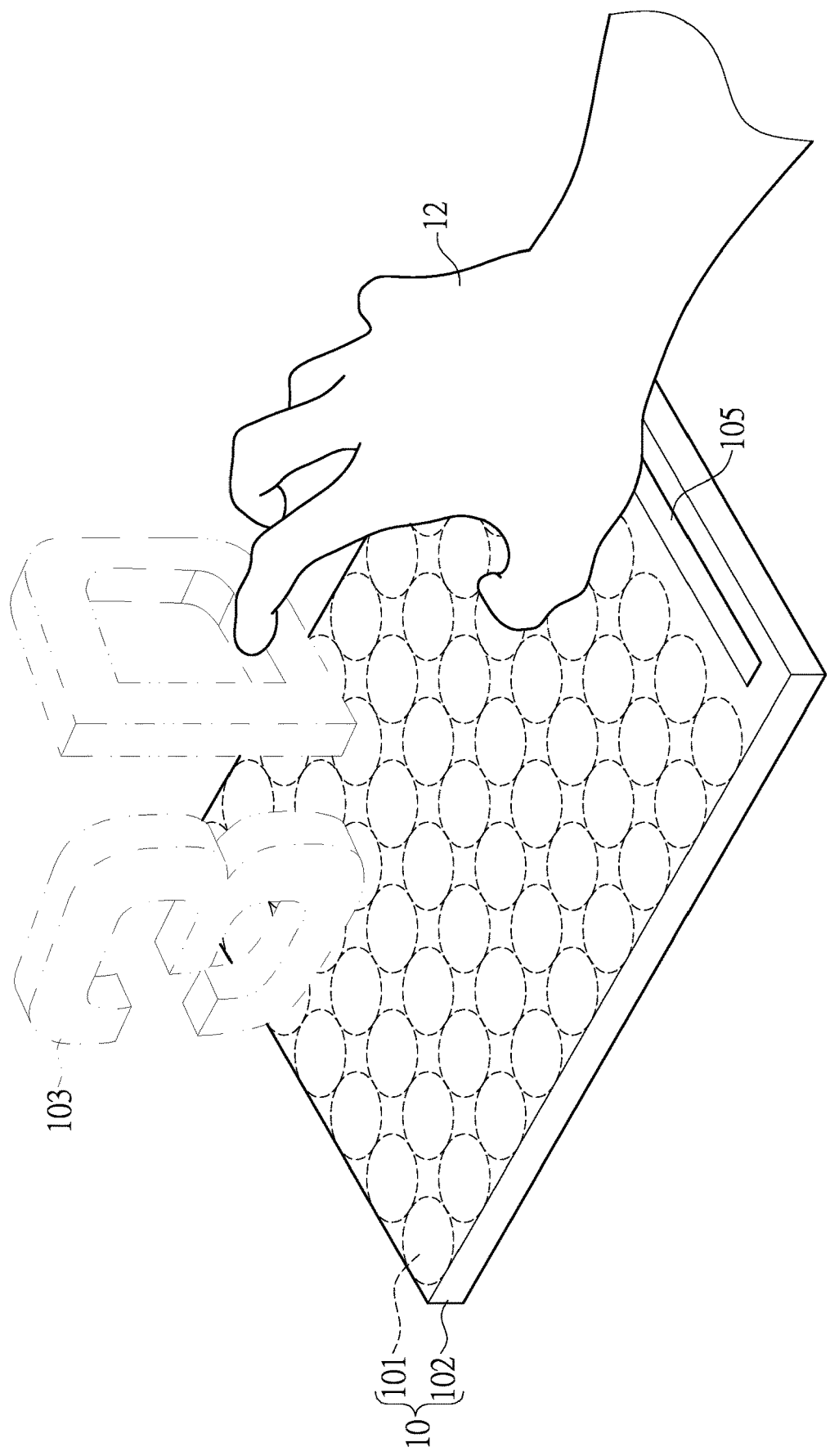
FIG. 1 is a schematic diagram depicting a stereoscopic image display system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to a method for performing interactive operation upon a stereoscopic image and a stereoscopic image display system, which allow a user to manipulate the stereoscopic image by gesture when viewing the stereoscopic image displayed on a stereoscopic image display. In an exemplary example, a gesture sensor is used to sense a gesture that is performed over the stereoscopic image. The gesture can be, for example, a clicking, a swiping, a circling or a zooming action performed by the user. Stereo coordinate variations corresponding to the gesture can be obtained and are used to determine an interactive command. According to the interactive command, the stereoscopic image display can display the stereoscopic image in response to the gesture. Therefore, the user can interact with the stereoscopic image by gesture. It should be noted that the stereoscopic image can be a static three-dimensional object or a moving object that is formed by a series of stereoscopic images in motion. The stereoscopic image that is formed in response to the gesture can be a static image, or a moving stereoscopic image that is calculated according to the gesture.

In one application, the stereoscopic image display is able to display a floating stereoscopic image. This technology utilizes a flat display panel to simultaneously display multiple unit images, and the unit images render a full image (i.e., an integrated image). During the process of displaying the floating image, the integrated image displayed on the flat display panel can be projected to a space at a distance from the panel through an optical element (e.g., a lens array). Every unit image displayed on the flat display panel can be imaged through a corresponding lens. Further, multiple unit images can render the integrated image through multiple lenses. Thus, an effect of displaying a floating image can be achieved.

Reference is made to FIG. 1, which is a schematic diagram depicting a stereoscopic image display system according to one embodiment of the disclosure.

In one embodiment of the present disclosure, a stereoscopic image display 10 is provided, and the stereoscopic image display 10 includes an optical element 101 and a display panel 102. An image processor is included for processing display content. The stereoscopic image display 10 communicates with an external image source to acquire stereoscopic image data. The stereoscopic image data is processed for rendering a stereoscopic image 103.

Further, the stereoscopic image display 10 includes a gesture sensor 105 that is used to sense the gesture performed upon the stereoscopic image 103 by a hand 12 of the user. It should be noted that the position of the gesture sensor 105 shown in the diagram is not used to limit the scope of the present invention.

The gesture sensor 105 can implement an image detection method, in which a camera is used to capture a series of images of one or more key portions of the hand 12. The key portions are, for example, a finger, a palm, and/or knuckles. Through an image processing method, changes of the images of the hand 12 within a period of time can be obtained. Each of the key portions of the hand 12 can be depicted by three-dimensional coordinates (e.g., $X_{sensor}$, $Y_{sensor}$ and $Z_{sensor}$ of the Cartesian coordinate system or $\gamma$, $\theta$ and $\varphi$ of the spherical coordinate system) with respect to the gesture sensor. After continuously acquiring coordinates of the gesture, a stereo coordinate variation can be obtained. The coordinates of a sensor-based coordinate system can be transformed to a display-based coordinate system with respect to the stereoscopic image display 10. Variations in the three-dimensional coordinates ($X_{device}$, $Y_{device}$, $Z_{device}$) can be expressed by vectors (i.e., displacement and direction) and rates (i.e., distance and time). The variations can be used to determine an interaction instruction that includes one or any combination of the clicking, the swiping, the rotating or the zooming action.

Figure 6:
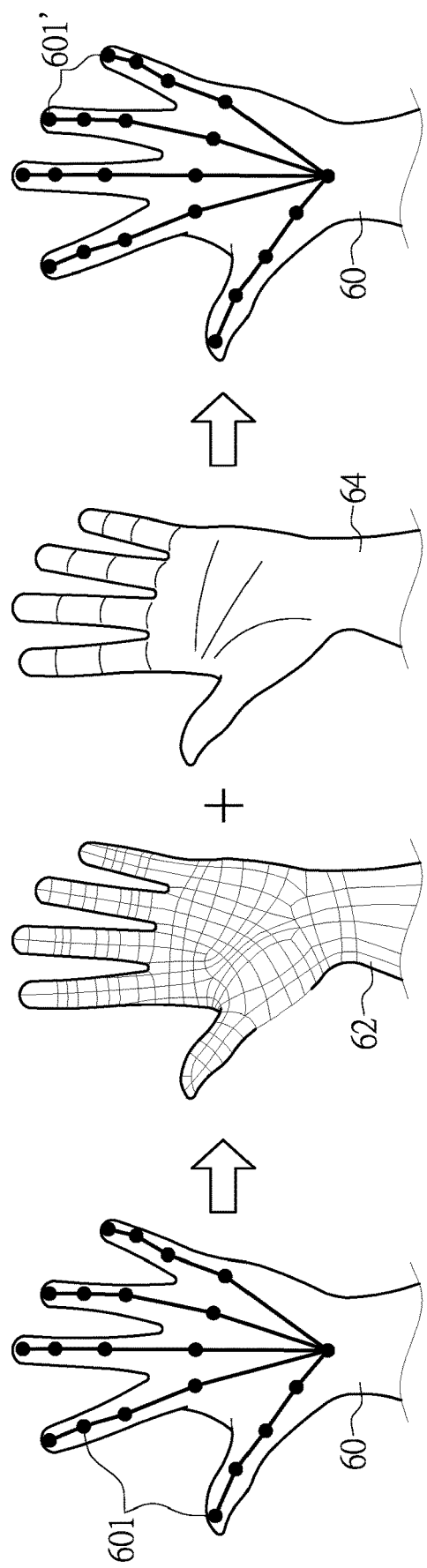
FIG. 6 is a schematic diagram depicting critical positions of a hand obtained in the method for performing the interactive operation upon the stereoscopic image according to one embodiment of the present disclosure.

Reference is made to FIG. 6, which is a schematic diagram depicting critical positions of a hand obtained in the method for performing interactive operation upon a stereoscopic image according to one embodiment of the pre sent disclosure.

A plurality of critical positions 601 of a hand 60 are shown in the diagram. The positions and the number of the critical positions 601 can be predetermined based on a practical requirement. A powerful computer can be adopted in the stereoscopic image display system, and is capable of processing more critical positions 601, so as to improve the capability of determining more details of the gesture. Therefore, a more subtle change in the gesture can be determined. The positions of the critical positions 601 of the hand 60 can be provided for the stereoscopic image display system to determine the gesture (such as clicking, swiping, rotating or zooming) performed by the hand 60 or a specific object.

The gesture sensor can obtain the plurality of critical positions 601 of the hand 60 that describe spatial positions of the hand 60 in a stereo coordinate. The gesture is therefore determined. Further, depth information of the plurality of critical positions 601 of the hand 60 can be used to establish a depth map 62. Or, the depth information can be added with colors or grayscales, or can be binarized, so as to form an image 64. A current state of the hand 60 can be specified by the plurality of critical positions 601'. A previous gesture state indicates the plurality of positions of key portions at a previous time, the depth map 62 and the image 64. The change of the gesture can be obtained. For example, the gesture can be used to determine the stereo coordinates of fingers, a palm of the hand 60, knuckles of the hand 60 or others (such as a stylus or any object). Accordingly, the change of the gesture within a period of time can be used to determine a click gesture, a swipe gesture, a rotation gesture or a zoom gesture.

Figure 9:
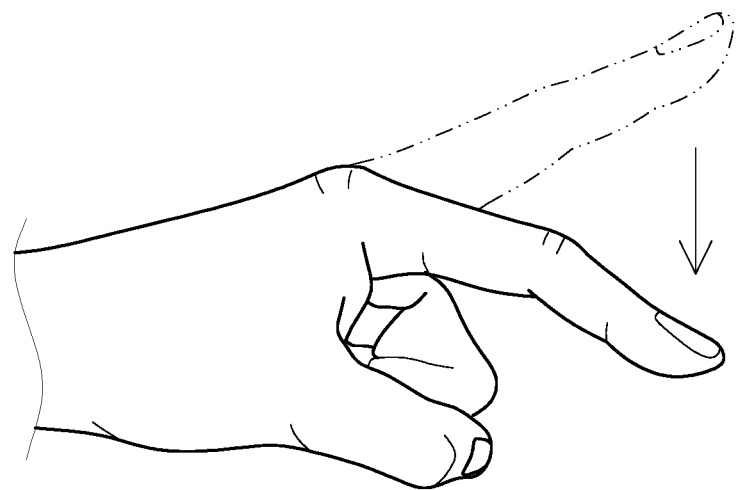
FIG. 9 to FIG. 12 are schematic diagrams depicting various gestures performed in the method for performing the interactive operation upon the stereoscopic image according to certain embodiments of the present disclosure.
Figure 10:
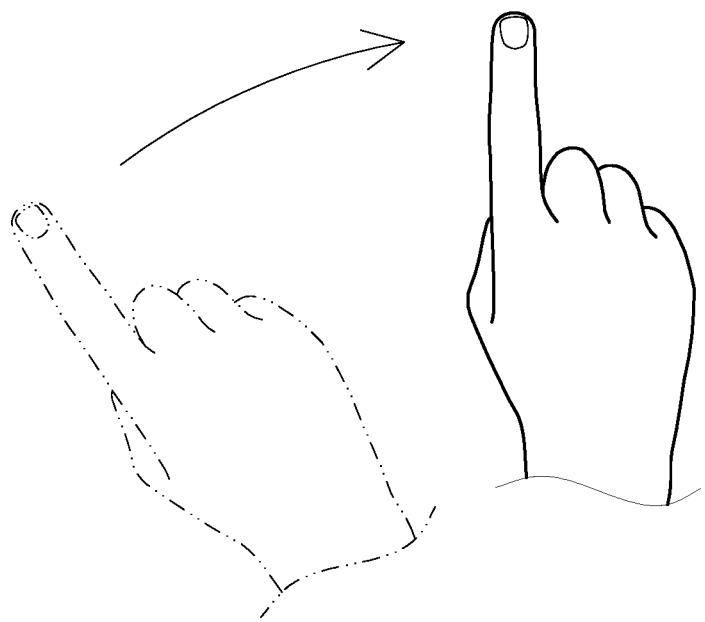
Figure 11:
Figure 12:
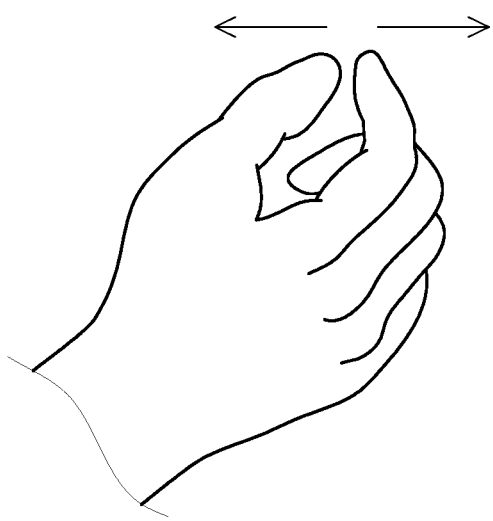

Regarding these gestures, reference can be made to FIG. 9 to FIG. 12. FIG. 9 schematically shows an action of the click gesture. FIG. 10 schematically shows an action of the swipe gesture. FIG. 11 schematically shows an action of the rotation gesture. FIG. 12 schematically shows an action of the zoom gesture.

Figure 7:
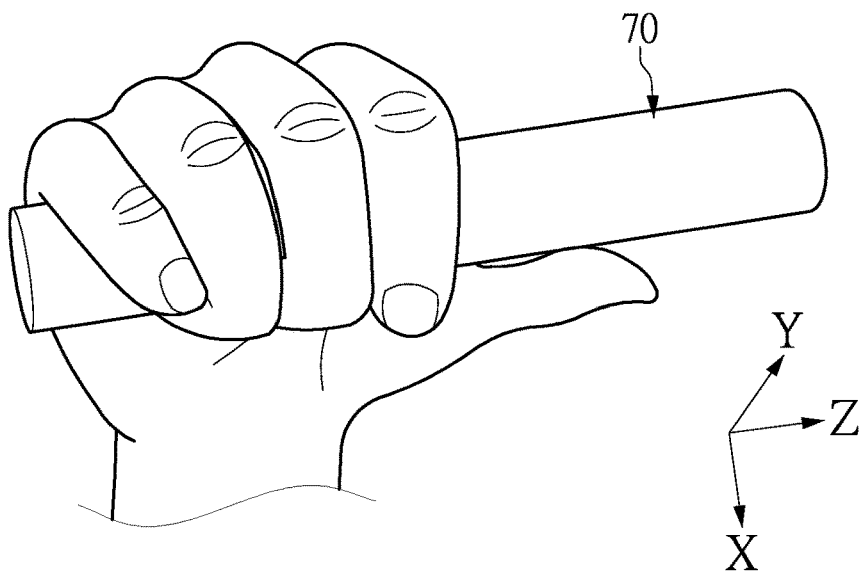
FIG. 7 is a schematic diagram depicting a handheld tool that is used to perform a gesture in the method for performing the interactive operation upon the stereoscopic image according to one embodiment of the present disclosure.

In addition to performing these gestures with the hand, the gestures can be performed by other objects. FIG. 7 is a schematic diagram depicting a hand holding a cylinder 70, and the motion of the cylinder 70 forms the coordinate variations. When the user holds the cylinder 70 to interact with a floating stereoscopic image, the gesture sensor obtains depth information of a plurality of critical positions of the cylinder 70 by a time of flight detection technology, an acoustic detection technology, a binocular parallax detection technology, or a structured light detection technology. The gesture is determined based on the stereo coordinate variations within a period of time.

Figure 8:
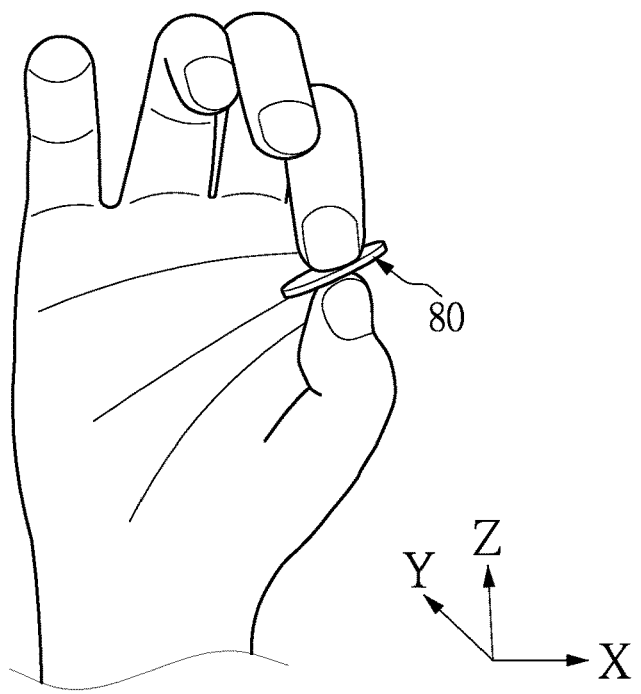
FIG. 8 is a schematic diagram depicting a handheld tool that is used to perform a gesture in the method for performing the interactive operation upon the stereoscopic image according to another embodiment of the present disclosure.

FIG. 8 schematically shows a hand holding a tiny object 80. The gesture sensor can obtain the stereo coordinate variations of the object 80 within a period of time.

In one further embodiment, the gesture sensor 105 senses a gesture by the principle of light blocking. The gesture sensor 105 uses a light source to emit a sensing light, and a photo sensor can sense light spots on the hand 12 when the hand 12 blocks the light within a range of the sensing light. Therefore, an amount of light spots reflected by each of the key portions and time differences occurred among the light spots can be obtained. It should be noted that the light spots reflected by the key portions reflect changes of the key portions, and the time differences indicate the information relating to depths of the key portions. Similarly, by continuously obtaining such light information, stereo coordinate variations formed by the gesture can be obtained. The gesture allows the system to identify an interactive command indicative of one or any combination of the actions (such as moving, rotating and zooming).

Figures 14, 15:
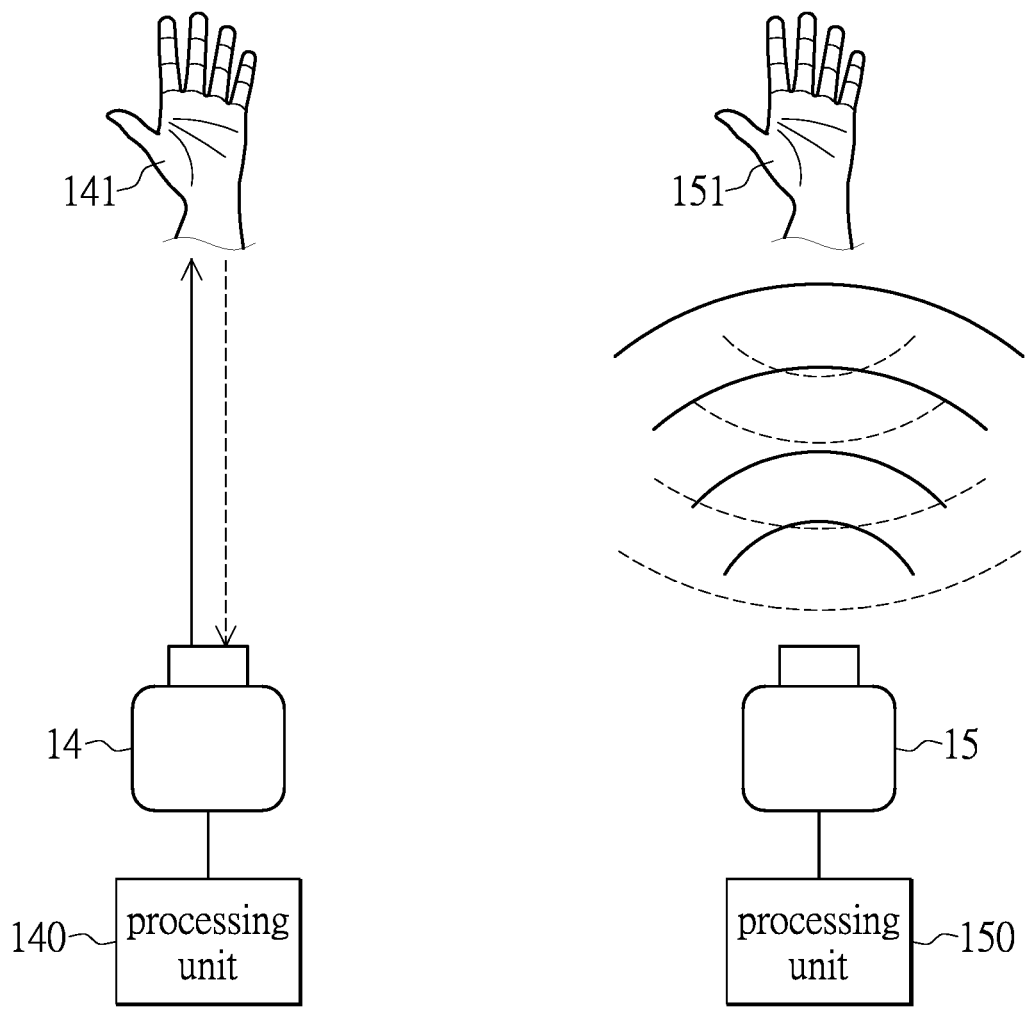
FIG. 14 to FIG. 17 are schematic diagrams depicting gesture sensing devices according to certain embodiments of the present disclosure.

For the light blocking technology, reference can be made to FIG. 14, which is a schematic diagram depicting a gesture being sensed by use of an image detection method according to one embodiment of the present disclosure. In FIG. 14, a photo sensor 14 is shown on a side of the stereoscopic image display. The photo sensor 14 senses a gesture performed by a hand 141. Sensing data generated by sensing the gesture with the photo sensor 14 is processed by a processing unit 140. A new stereoscopic image can be calculated based on a change between a previous gesture state and a current gesture state. In one embodiment of the present disclosure, the photo sensor 14 can be equipped with a visible light emitter or an invisible light emitter. Preferably, a light emitter can be embodied by an infrared light emitter, and the photo sensor 14 is configured to sense the light in a frequency band that complies with the light emitter. The photo sensor 14 is configured to receive the light reflected by the hand 141 or a specific object. The reflected light is the reflective light being blocked by the hand 141 or any other object. A time difference between the emitting light and the reflective light is used to obtain the depth information of the plurality of key portions of the hand 141.

In one further embodiment, the gesture sensor 105 can include a sound generator and a sound receiver, so as to use acoustic waves reflected by the hand 12 to determine the gesture. When the hand 12 is within a sensing range of the acoustic waves of the gesture sensor 105, the hand 12 blocks the acoustic waves, and the reflected waves are formed. When the sound receiver receives the reflected waves, changes of the reflected waves allow the sound receiver to detect variations of the key portions of the hand 12 in a space. The variations of the key portions can be interpreted as the stereo coordinate variations that can be used to determine the interactive command indicative of one or any combination of the actions (such as clicking, swiping, rotating and zooming).

FIG. 15 is a schematic diagram depicting a gesture being determined by use of an acoustic sensing technology according to one embodiment of the present disclosure. An acoustic sensor 15 is shown in the diagram. The acoustic sensor 15 includes an acoustic emitter that emits an acoustic wave within the effective sensing zone. The acoustic wave can be an ultrasound wave or a radar wave. The gesture performed by a hand 151 or any object within the effective sensing zone reflects the acoustic wave, and an acoustic sensor 15 receives the reflected wave. Accordingly, sensing data is generated and processed by a processing unit 150. Time differences with respect to the key portions of the hand 151 that reflect the acoustic wave can be calculated. Therefore, the depth information of each of the key portions can be obtained and used to determine the gesture.

Figure 16:
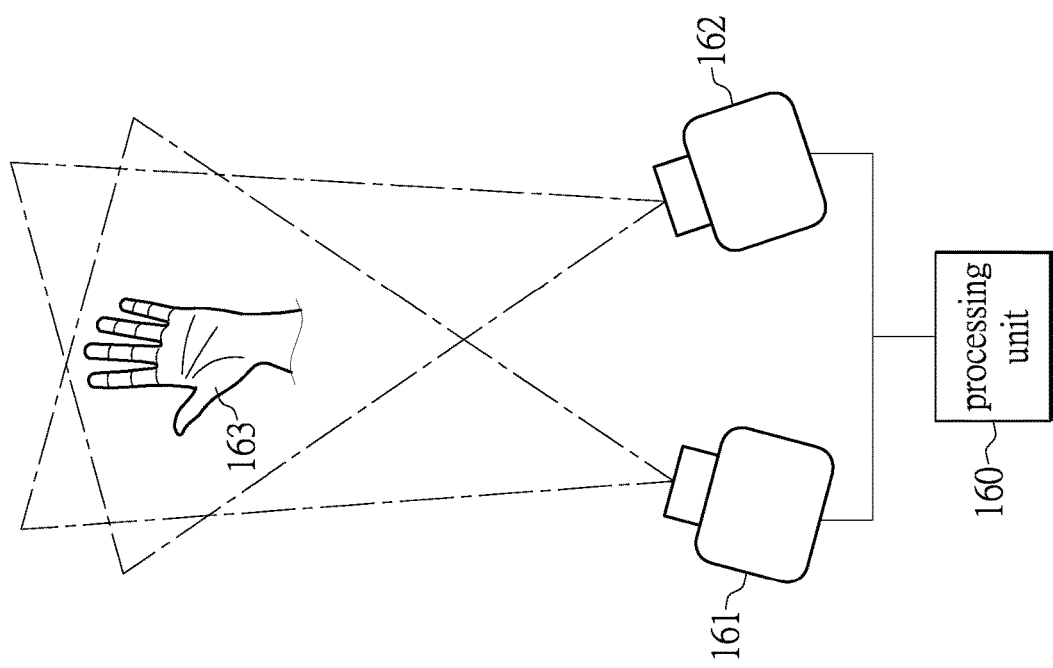

Further, FIG. 16 is a schematic diagram depicting use of two photo sensors to form a parallax for a hand 163 or a specific object that performs a gesture. The depth information with respect to the key portion of the hand 163 or any object can be calculated. In FIG. 16, a first photo sensor 161 and a second photo sensor 162 with a distance there-between are disposed near the stereoscopic image display. The first photo senor 161 and the second photo sensor 162 obtain two respective images of the hand 163 at the same time, and the parallax for the hand 163 is formed. The parallax information is processed by a processing unit 160, so as to calculate the depth information based on the parallax data with respect to the plurality of key portions of the hand 163. The gesture performed by the hand 163 or any object can then be determined.

Figure 17:
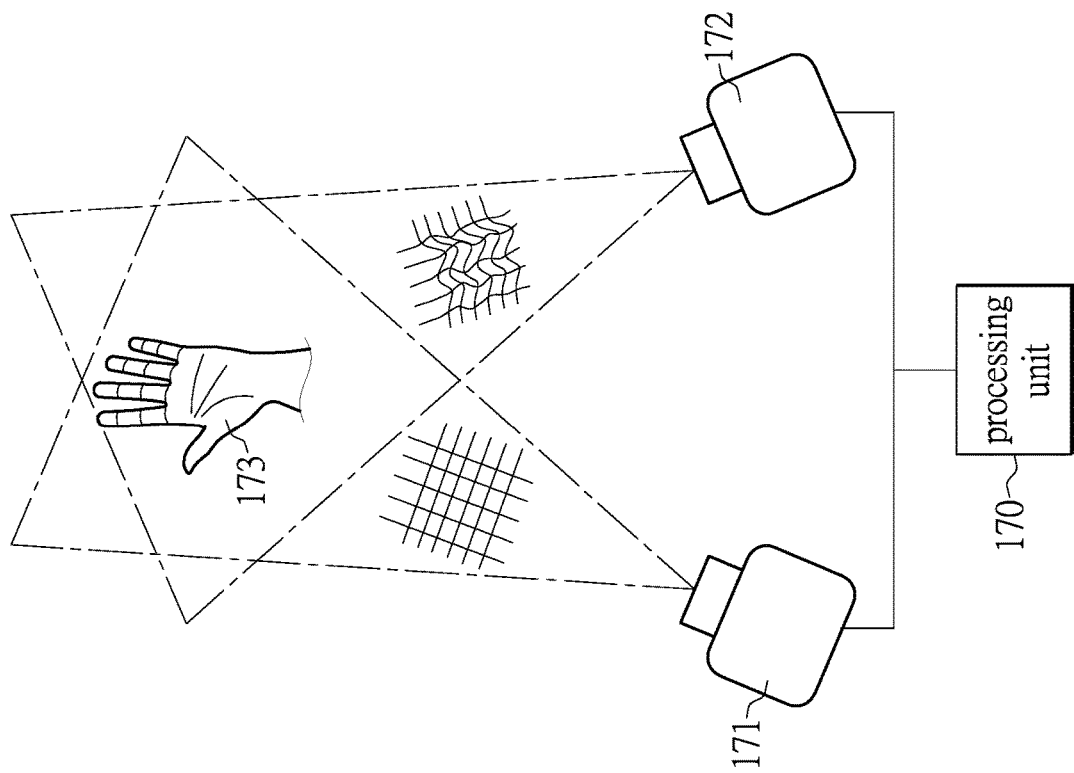

FIG. 17 is a schematic diagram depicting use of a structured light to sense a gesture according to one embodiment of the present disclosure. A structured light emitter 171 and a structured light sensor 172 are disposed near the stereoscopic image display for establishing the effective sensing zone. The structured light emitter 171 emits a structured light with a specific pattern within the effective sensing zone. The pattern can be parallel lines, a mesh or other patterns. The structured light is illuminated on a hand 173 or a specific object, and the structured light sensor 172 senses the structured light reflected by the hand 173. Since the reflective light is also a kind of structured light, the reflective structured light can be processed by a processing unit 170. By the processing unit 170, the reflective structured light can be used to calculate a three-dimensional curved surface of the hand 173, and the gesture can be determined accordingly.

The gesture sensor 105 that adopts different gesture sensing techniques can be used to implement an interactive sensing method. According to the positions of the fingers, the palm and/or the knuckles of the hand 12, and especially the variations of three-dimensional coordinates of the knuckles reflected by the gesture, the interactive command indicative of one or any combination of actions (such as moving, rotation and zooming) can be determined. After that, by querying the stereoscopic image data in an image database, new corresponding stereoscopic image data can be used to display a next stereoscopic image. The stereoscopic image data can include a static stereoscopic image or a video formed by a series of stereoscopic images. It should be noted that an interactive effect resulting from an instant reaction to the gesture can be achieved by having processes that include sensing the variations, transforming the coordinates, and calculating the stereoscopic image carried out with high-speed computation.

Figure 2:
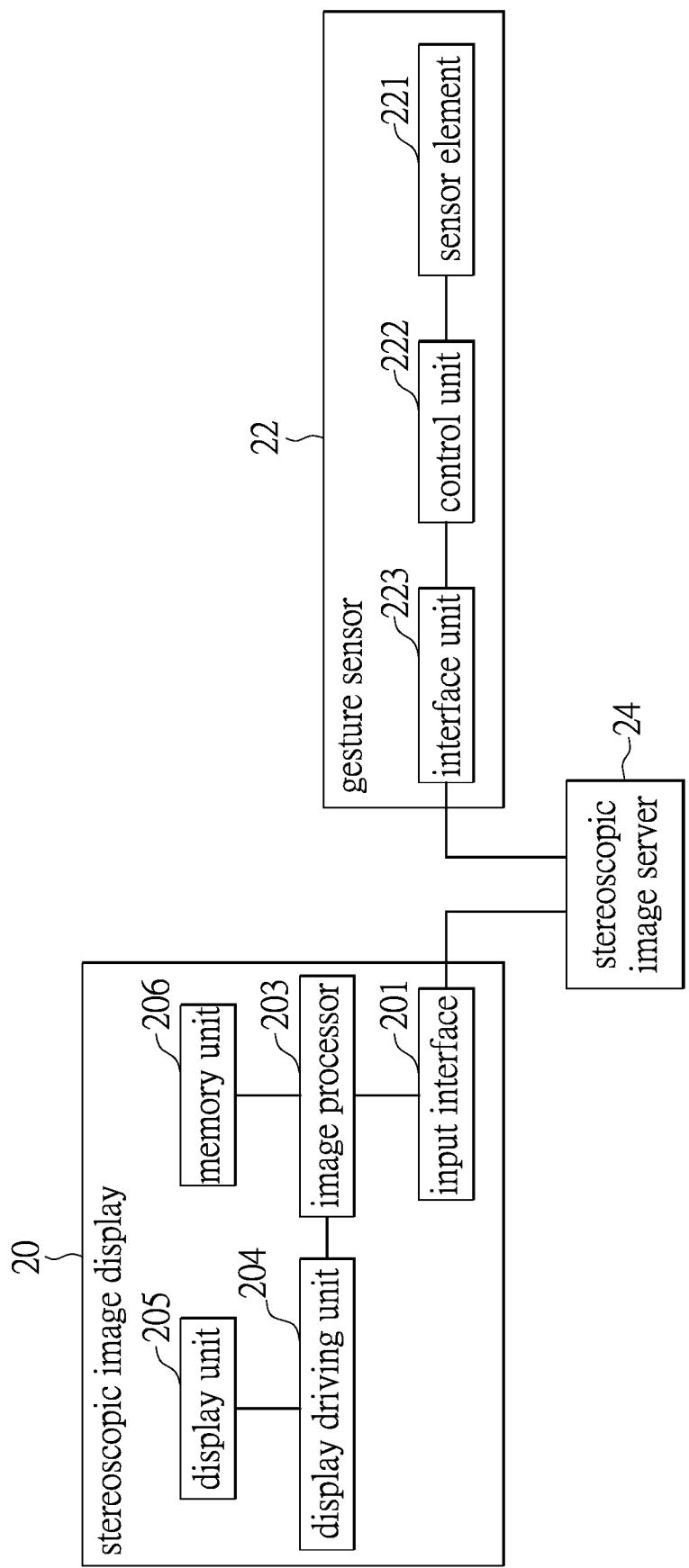
FIG. 2 is a circuit diagram depicting circuitry of the stereoscopic image display system according to one embodiment of the present disclosure.

Reference is made to FIG. 2, which is a circuit diagram depicting circuitry of the stereoscopic image display system according to one embodiment of the disclosure.

A stereoscopic image display 20 is provided in the diagram. The stereoscopic image display 20 connects with a gesture sensor 22 via a specific connection or a specific structure. In one of the embodiments of the present disclosure, both the gesture sensor 22 and the stereoscopic image display 20 can be two modules that are integrated into one device and are electrically interconnected. Alternatively, the stereoscopic image display 20 and the gesture sensor 22 are two independent devices that are interconnected via a wired connection or a wireless connection for communication with each other. In one further embodiment, as shown in FIG. 2, a stereoscopic image server 24 is provided. The stereoscopic image display 20 and the gesture sensor 22 connect with the stereoscopic image server 24 via a network or a specific connection. The stereoscopic image server 24 processes the changes of the gesture sensed by the gesture sensor 22. The changes of the gesture can be variations in a three-dimensional space. The stereoscopic image server 24 produces the stereoscopic image data to be transmitted to the stereoscopic image display 20.

In the stereoscopic image display 20, an image processor 203 that performs image processing in the interactive sensing method is provided. The image processor 203 is electrically connected with other electronic components, such as an input interface 201. The input interface 201 can be a communication interface that is used to connect with the stereoscopic image server 24 via a network or a specific connection. Through the input interface 201, the stereoscopic image display 20 can receive from the stereoscopic image server 24 the stereoscopic image data that is used to render the to-be-displayed stereoscopic image. The stereoscopic image data provided by the stereoscopic image server 24 is generated according to the interactive command that is obtained by converting the gesture sensed by the gesture sensor 22. According to one embodiment of the present disclosure, the data that the stereoscopic image server 24 receives from the gesture sensor 22 includes the stereo coordinate variations formed by sensing the gesture. The stereoscopic image server 24 calculates the interactive command according to the stereo coordinate variations, and also calculates the image coordinate data with respect to a new stereoscopic image according to the interactive command.

In the stereoscopic image server 24, when the stereo coordinate variations corresponding to the gesture sensed by the gesture sensor 22 are received, the interactive command indicative of the clicking, swiping, rotating and/or zooming actions can be calculated. The interactive command is provided for looking up the image database in the stereoscopic image server 24, so as to obtain the stereoscopic image data corresponding to the variations. Or, according to the interactive command, the stereoscopic image data can be instantly calculated by a processor of the stereoscopic image server 24. The stereoscopic image can be a static stereoscopic image or a video formed by a series of stereoscopic images. The stereoscopic image data provided to the stereoscopic image display 20 is used to describe color information and three-dimensional space information for the stereoscopic image display 20 to display the stereoscopic image. The image processor 203 is electrically connected with a display driving unit 204, so that the stereoscopic image can be generated based on the stereoscopic image data and be displayed by a display unit 205.

The gesture sensor 22 includes a sensor element 221 that is used to sense the gesture by lights, sounds, or images. The gesture refers to changes of some key portions of a hand, including the changes of the positions of fingers, palm and/or knuckles.

A control unit 222 acts as a control circuit of the gesture sensor 22. The control unit 222 connects with the stereoscopic image display 20 via an interface unit 223. The control unit 222 produces the stereo coordinate variations of the gesture sensed by the sensor element 221.

Further, the stereo coordinate variations corresponding to the gesture sensed by the gesture sensor 22 are based on the coordinates in the coordinate system with respect to the gesture sensor 22. A coordinate transformation may be required if the stereo coordinate variations are transferred to the stereoscopic image server 24, so as to calculate the interactive command According to the interactive command, the coordinate transformation is performed through the stereoscopic image server 24 to transform coordinate data in the sensor-based coordinate system into the display-based coordinate system for displaying the stereoscopic image through image coordinate data. In one further embodiment of the present disclosure, through the input interface 201, the stereoscopic image display 20 connects with the interface unit 223 of the gesture sensor 22 via a wired connection or a wireless connection. The input interface 201 is a communication interface that is used to transmit signals therebetween. The stereoscopic image display 20 calculates the stereoscopic image data based on the gestures, and displays the stereoscopic image by the display unit 205.

The stereoscopic image display 20 displays the stereoscopic image according to the well-defined positions of the whole image. When the positions of the whole image are fed back to the stereoscopic image server 24, the stereoscopic image server 24 can determine a correlation of the gesture between its original coordinate system and the coordinate system after the coordinate transformation. The correlation indicates a relationship between the three-dimensional coordinates with respect to the gesture and the stereoscopic image to be displayed. In an exemplary example, a swiping gesture causes the stereoscopic image to move toward a specific direction, and a variation along this direction should be added to the three-dimensional coordinates of the stereoscopic image. Therefore, the stereoscopic image should be updated to a new position, so as to generate a new stereoscopic image. In the stereoscopic image server 24 (or directly in the image processor 203 of the stereoscopic image display 20), new stereoscopic image data can be obtained by querying the image database or by being calculated instantly. The stereoscopic image data is provided to the display driving unit 204 of the stereoscopic image display 20 for displaying the stereoscopic image. Further, a rotation gesture causes the stereoscopic image to rotate at an angle, so that this variation should be added to the three-dimensional coordinates of the stereoscopic image, and another new stereoscopic image data can then be formed. Still further, a zoom gesture will change a size of the stereoscopic image at a same reference position. The three-dimensional coordinates relating to the stereoscopic image changes with the zoom gesture. After the image processor 203 queries the image database or performs an instant calculation, new stereoscopic image data is generated for the display driving unit 204 to display.

The above-described swipe, rotation and zoom gestures can be arbitrarily combined to form the interactive command. The stereoscopic image server 24 (or the image processor 203 of the stereoscopic image display 20) is in charge of calculating the new stereoscopic image data. The stereoscopic image data is provided for the stereoscopic image display 20 to display the stereoscopic image. To reflect a current gesture, a software sequence operated in the stereoscopic image server 24 or in the image processor 203 of the stereoscopic image display 20 determines multiple pieces of continuous stereoscopic image data by referring to the previous gesture state, so as to display a moving stereoscopic image.

Figure 3:
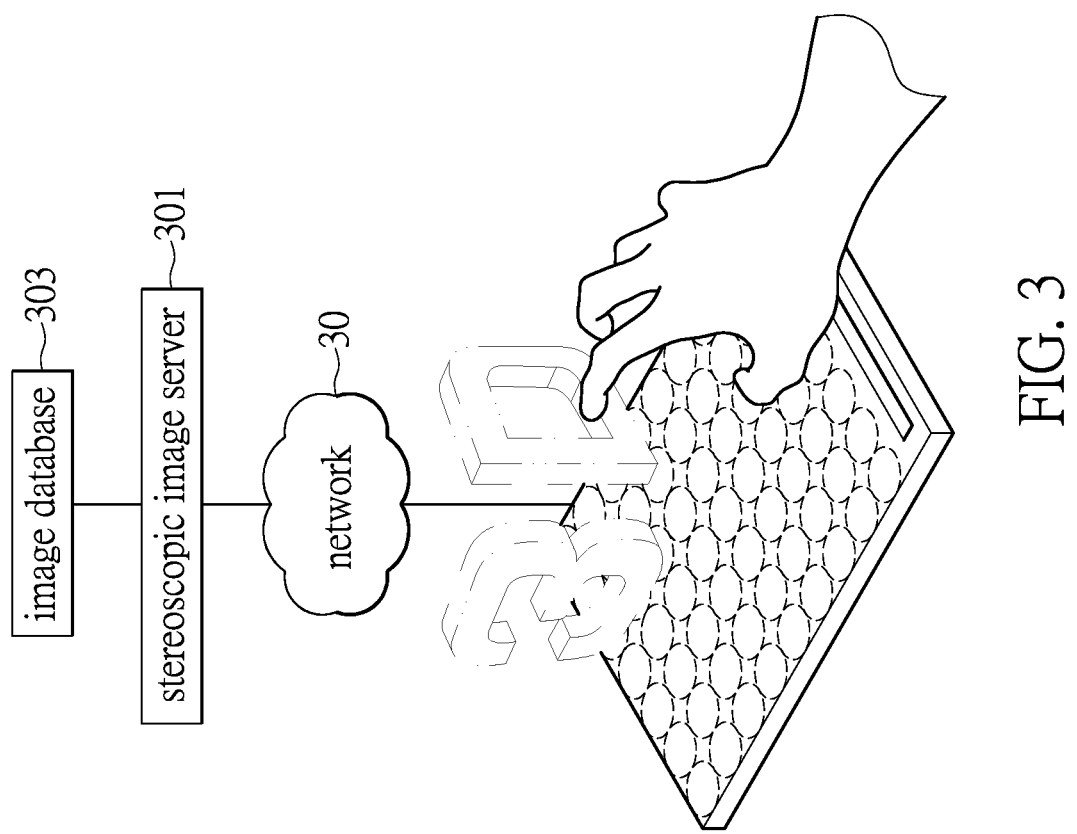
FIG. 3 is a schematic diagram depicting a stereoscopic image display system according to another embodiment of the present disclosure.

Reference is made to FIG. 3, which shows a stereoscopic image display system according to another embodiment of the present disclosure. An interactive stereoscopic display connects with a stereoscopic image server 301 via a network 30. The above-mentioned stereoscopic image data can be provided by the stereoscopic image server 301. The stereoscopic image server 301 provides an image database 303 for querying the stereoscopic image data according to an interactive command.

In an exemplary example, when the user performs an interaction, the data stored in a memory of the stereoscopic image display 20 can be checked to determine if image data relating to a next state (which corresponds to the interactive command) is included. If the data stored in the stereoscopic image display 20 already includes the image data relating to the next state, the stereoscopic image display 20 can itself produce the stereoscopic image data and display the stereoscopic image. Conversely, if the stereoscopic image display 20 does not include the image data relating to the next state, a request for acquiring new stereoscopic image data/file is generated and transmitted to the stereoscopic image server 301 via the network 30. The new stereoscopic image data can be downloaded and displayed as a new stereoscopic image in response to the interaction.

Referring to FIG. 1, when an interaction is performed upon the stereoscopic image displayed on the stereoscopic image display 10 by the hand 12 of the user, the gesture forms stereo coordinate variations that are referred to, so as to obtain the interactive command. The interactive command is transmitted to the stereoscopic image server 301 via the network 30, and the stereoscopic image server 301 provides new stereoscopic image data according to the interactive command.

Figure 4:
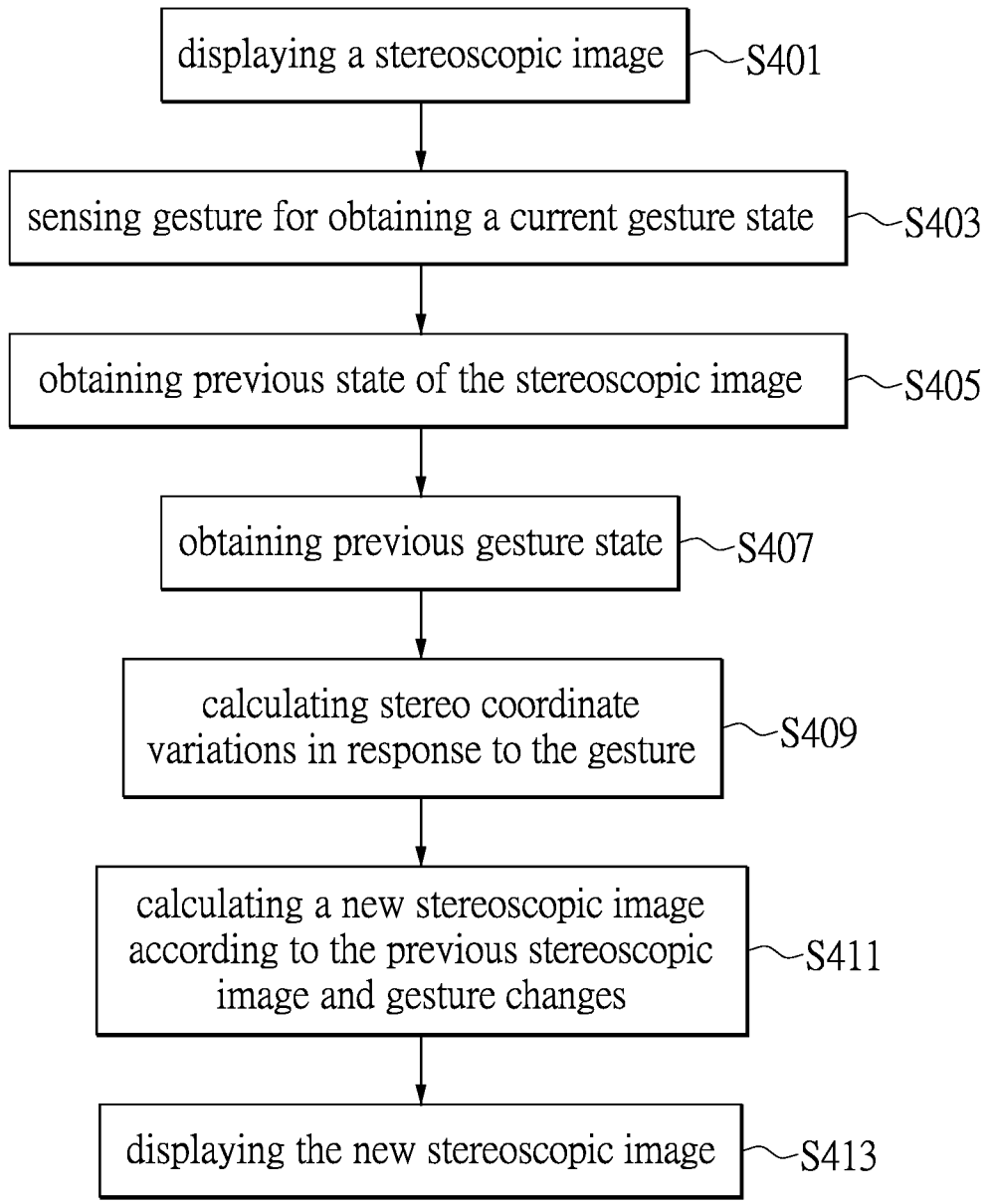
FIG. 4 is a flowchart describing a method for performing interactive operation upon a stereoscopic image according to one embodiment of the pre sent disclosure.

The stereoscopic image display system performs the method for performing the interactive operation upon the stereoscopic image. Reference can be made to FIG. 4, which is a flowchart describing the method according to one embodiment of the present disclosure.

Based on the stereoscopic image data, the stereoscopic image display system uses the stereoscopic image display to display the stereoscopic image, such as the floating stereoscopic image exemplarily shown in FIG. 1 (step S401). The floating stereoscopic image allows the user to perform a gesture thereupon with his hand or any object intuitively. When the user performs the gesture upon the floating stereoscopic image, the gesture sensor senses the gesture and obtains a gesture state (step S403). In one of the embodiments, the hand or the object blocks the lights of the floating stereoscopic image. Accordingly, the stereoscopic image display system can obtain a gesture image through the gesture sensor, and can further determine an interactive command formed by the gesture. The gesture sensors exemplarily shown in FIG. 14 to FIG. 17 are used to obtain depth information of the hand parts or the object, and the depth information is used to determine the gesture state. It should be noted that the gesture sensors are not limited by those shown in FIG. 14 to FIG. 17.

According to one embodiment of the present disclosure, the stereoscopic image display system provides any type of a storage that is used to store the previous gesture state (that is, stereo coordinates and movement data of multiple critical positions of a previous gesture) and a previous state of the stereoscopic image (that is, stereo coordinates and movement data of a previous stereoscopic image). Thus, the stereoscopic image display system can obtain the previous state of the stereoscopic image from the storage when any gesture is sensed. The previous state of the stereoscopic image includes the stereo coordinates that can be indicative of position, velocity, acceleration, pose and size of the stereoscopic image at a previous time (step S405). The previous gesture state that can be indicative of position, velocity and size of the gesture determined by the system at a previous time can also be obtained (step S407). Afterwards, a software sequence operated in the stereoscopic image display system is able to calculate stereo coordinate variations with respect to the gesture based on the previous gesture state and the current gesture state, so as to determine the gesture. The gesture is then used to obtain an interactive command, such as a click command, a swipe command, a rotation command, or a zoom command (step 409).

The software sequence operated in the stereoscopic image display system calculates the stereo coordinates of the new stereoscopic image based on the previous state of the stereoscopic image. In step S411, the stereoscopic image data can be obtained by querying an image database, and the stereoscopic image data is used to render the new stereoscopic image. The stereoscopic image display then displays a new stereoscopic image according to the new stereoscopic image data (step S413).

Figure 5:
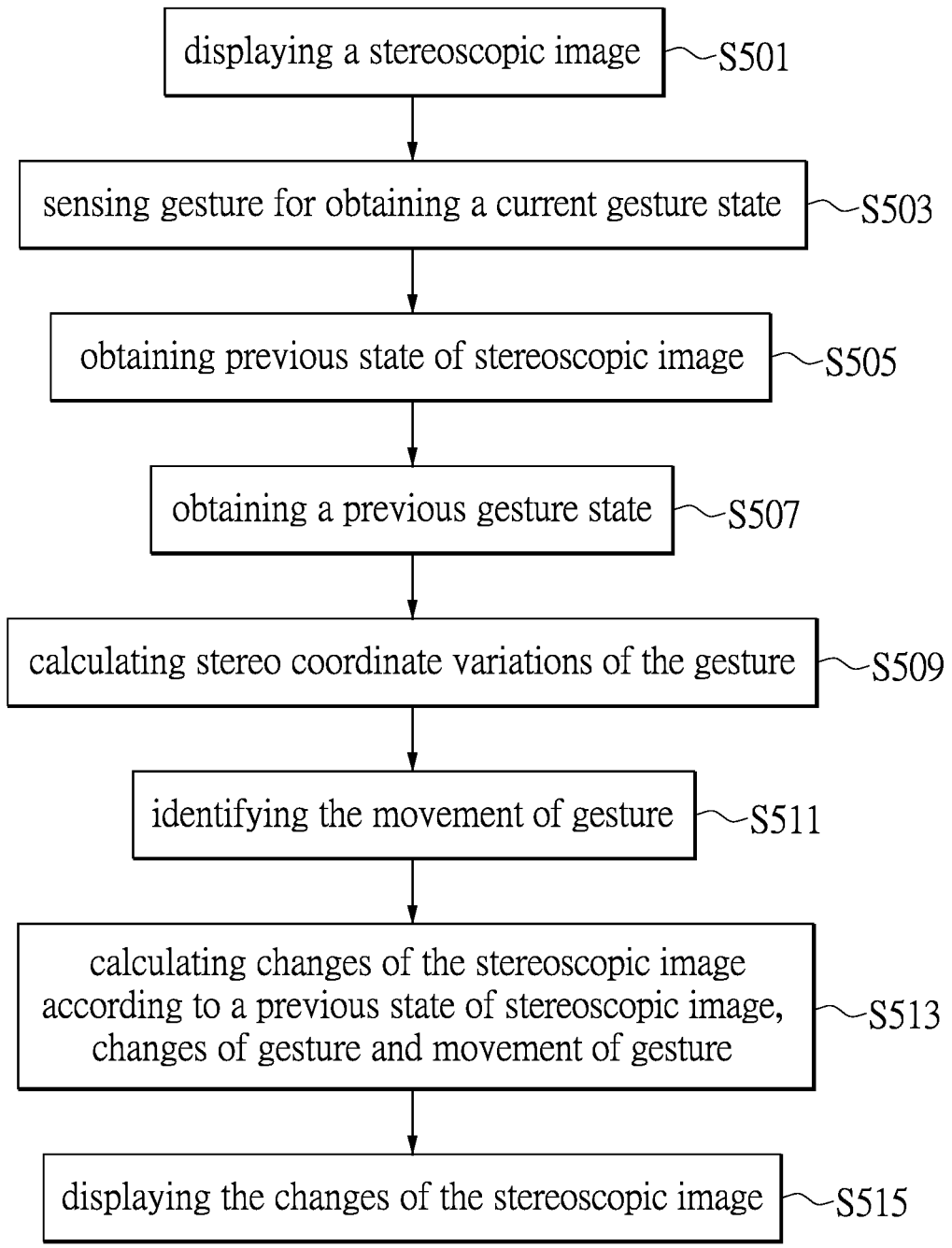
FIG. 5 is a flowchart describing a method for performing interactive operation upon a stereoscopic image according to another embodiment of the pre sent disclosure.

FIG. 5 is a flowchart describing a method for performing interactive operation upon a stereoscopic image according to another embodiment of the present disclosure.

The stereoscopic image display displays a stereoscopic image (step S501). The gesture sensor obtains a current gesture state (step S503). In the meantime, the stereoscopic image display system queries a previous state of the stereoscopic image (step S505) and a previous gesture state that can be the stereo coordinates with respect to the gesture at a previous time (step S507). The software sequence operated in the stereoscopic image display system calculates variations of the stereo coordinates of the hand or the object that performs the gesture within a period of time (step S509). The variations of the stereo coordinates are used to obtain movement data that includes changes of positions of the gesture, velocities, accelerations and changes of size within a period of time. The changes can be used to determine an interactive command, such as a click command, a swipe command, a rotation command or a zoom command.

Next, the software sequence operated in the stereoscopic image display system relies on the previous state of the stereoscopic image and the stereo coordinate variations reflecting the gesture to obtain gesture-movement data, so as to obtain changes of the stereoscopic image (step S511). The gesture (such as a click gesture, a swipe gesture, a rotation gesture or a zoom gesture) is therefore determined. The software sequence operated in the system calculates a change of the positions, the velocities, the accelerations and a change of the size of a series of stereoscopic images that reflect the gesture (step S513), and by which the stereoscopic image display displays the new stereoscopic image during a change (step S515).

In the exemplary examples of the gesture sensors shown in FIG. 14 to FIG. 17, the gesture sensors can implement a time of flight (TOF) detection technology, an acoustic wave detection technology, a binocular parallax detection technology, a structured light detection technology or other depth sensing methods, so as to obtain depth information of the gesture that is used to form a depth map exemplarily shown in FIG. 6. As shown in FIG. 6, the gesture sensor is used to obtain an image 64 and a depth map 62 of a hand (or other body parts) or a pointing device such as a handheld tool. Stereo coordinates of a plurality of critical positions 601' are accordingly determined based on the image 64 and the depth map 62, and the stereo coordinate variations corresponding to the gesture can be obtained by referring to the previous gesture state.

In continuation of the above, the stereoscopic image display system relies on the stereo coordinate variations of the gesture to determine an interactive command that can be a click command, a swipe command, a rotation command, or a zoom command Afterwards, these commands are used to query a database for obtaining the new stereoscopic image data or to instantly calculate the new stereoscopic image data. The stereoscopic image display then displays a new stereoscopic image based on the new stereoscopic image data. The gesture-movement data can be obtained according to stereo coordinate variations between the previous state and the current state of the stereoscopic image. The gesture-movement data includes a position change, a velocity, an acceleration and a change of size of the stereoscopic image within a period of time, and by which the stereoscopic image display displays the new stereoscopic image during a change.

Figure 13:
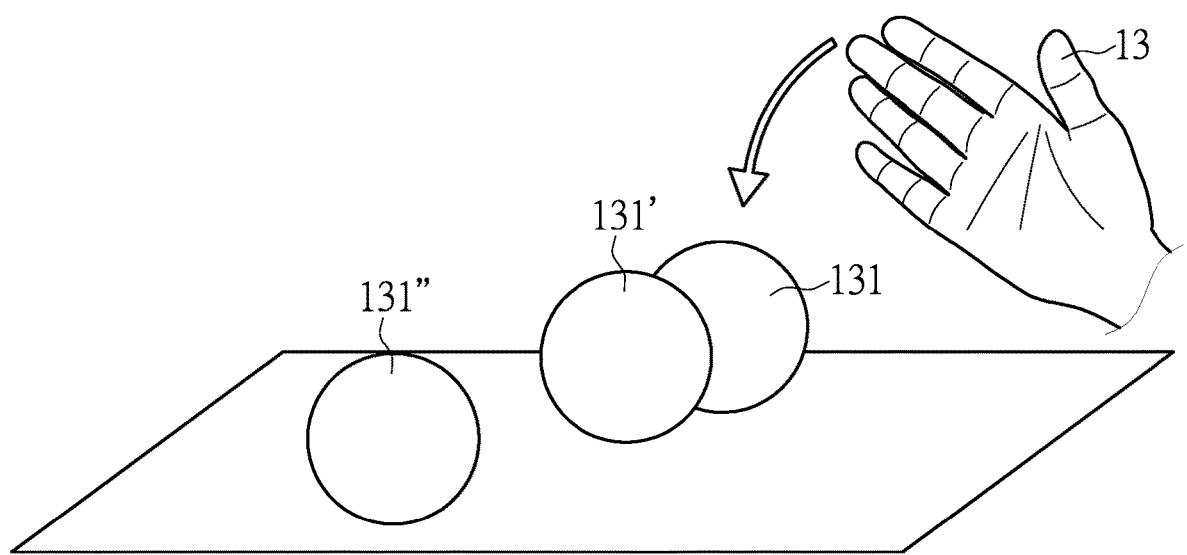
FIG. 13 is a schematic diagram depicting how the stereoscopic image varies in response to a change of the hand according to one embodiment of the present disclosure.

FIG. 13 is a schematic diagram depicting a change of the stereoscopic image caused by a gesture performed by a hand according to one embodiment of the present disclosure. The diagram exemplarily shows a previous gesture state and a series of images 131, 131' and 131" of a ball caused by a gesture performed by the hand 13. The software sequence operated in the stereoscopic image display system obtains movement data of the hand 13 according to the previous gesture state and the current gesture state. The movement data is used for obtaining a changing stereoscopic image (as shown by the images 131, 131' and 131" of the ball in the present example).

Figure 18:
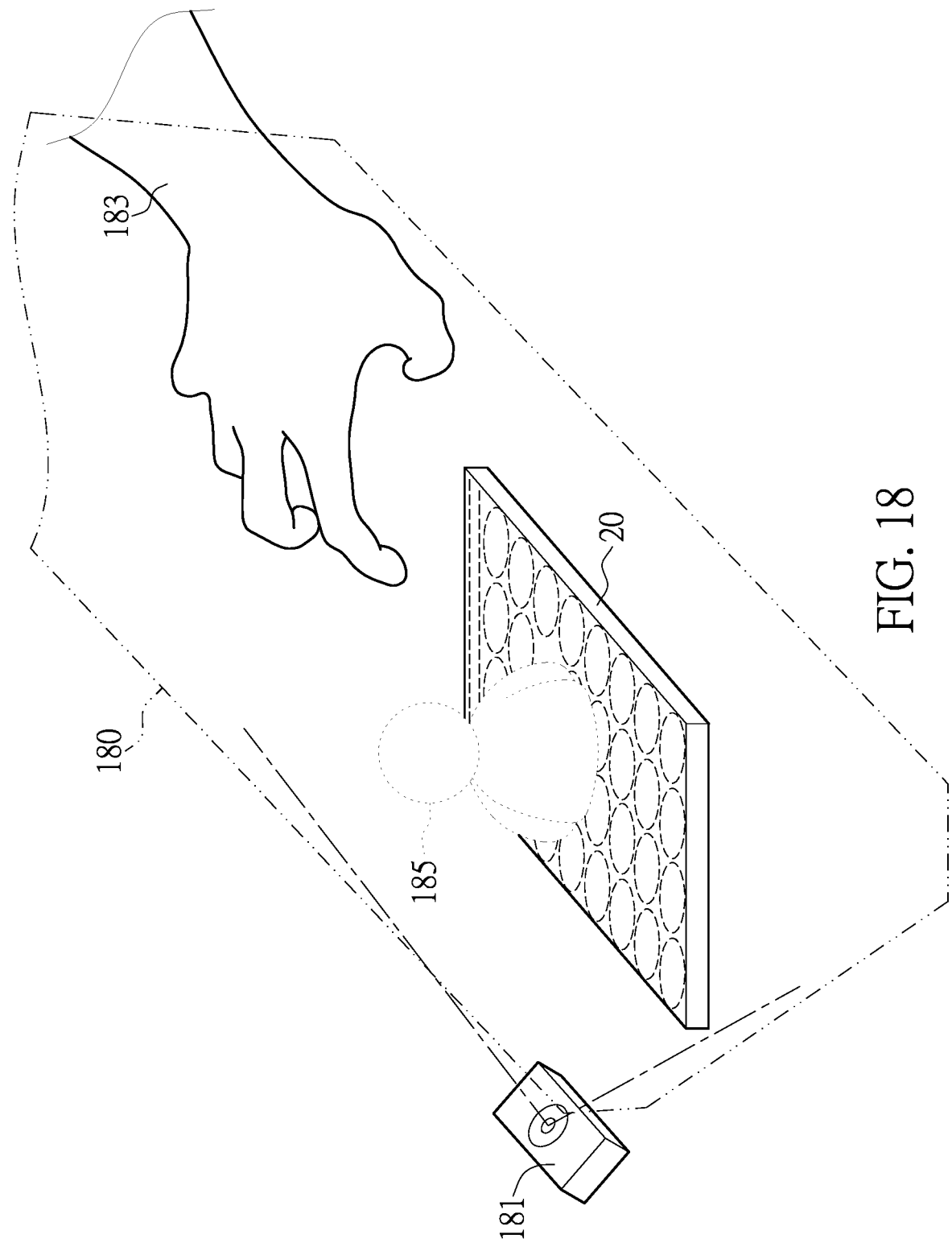
FIG. 18 to FIG. 20 are schematic diagrams depicting an effective sensing zone being established in the stereoscopic image display system according to certain embodiments of the present disclosure.

As shown in the above embodiments, the stereoscopic image display system relies on a gesture sensor disposed near the stereoscopic image display to establish an effective sensing zone. Reference is made to FIG. 18, in which a stereoscopic image display 20 that displays a stereoscopic image 185, a gesture sensor 181 disposed at a side of the stereoscopic image display 20, and an effective sensing zone 180 formed in an opposite space relative to the stereoscopic image display 20 are shown. Within the effective sensing zone 180, the gesture sensor 181 can effectively sense positions and actions of a hand 183 of the user. The effective sensing zone 180 also provides the user a reference zone for performing a gesture.

Figure 19:
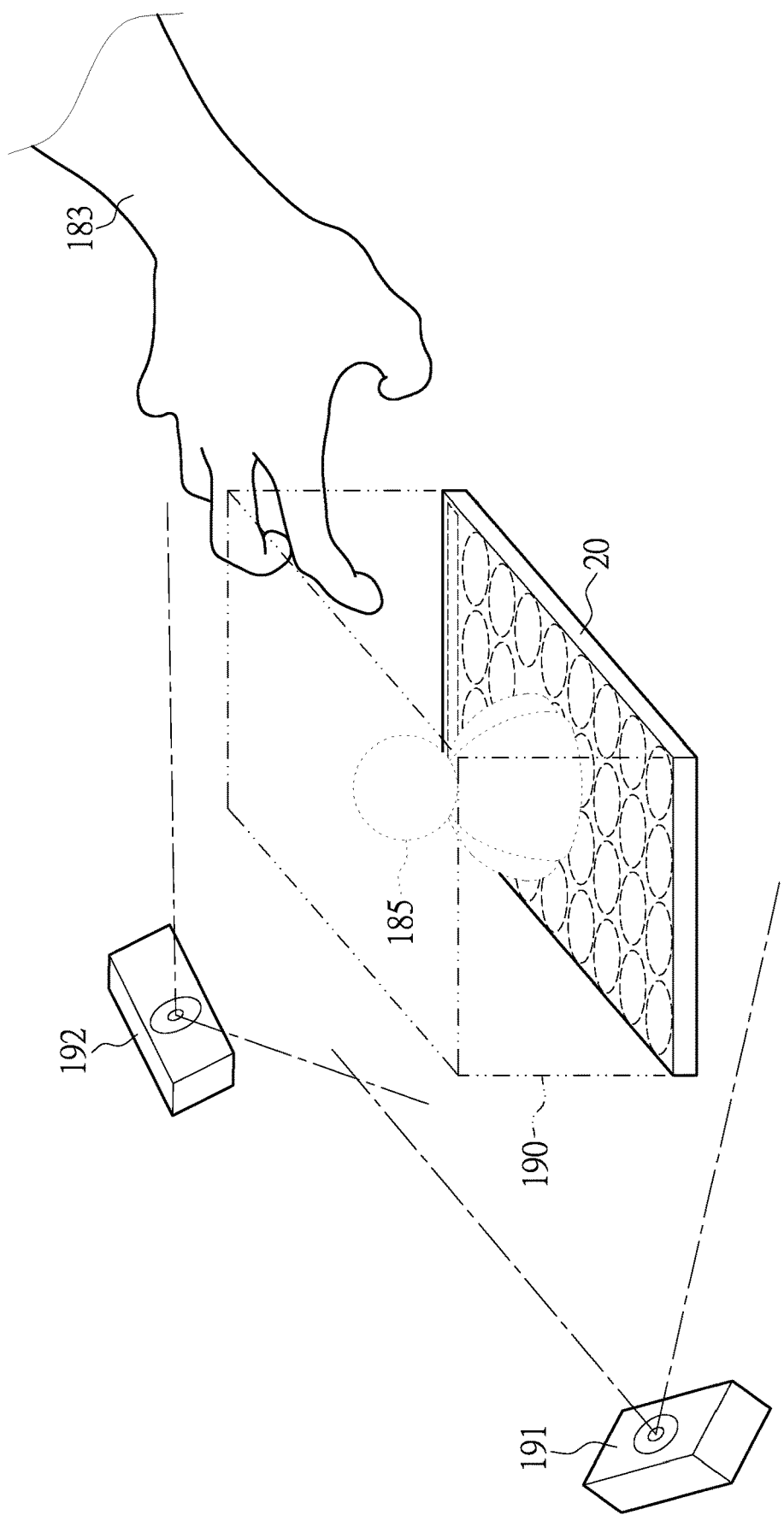

FIG. 19 is a schematic diagram depicting an effective sensing zone according to another embodiment of the present disclosure. In FIG. 19, the above-mentioned stereoscopic image 185 is displayed above the stereoscopic image display 20. A zone covering the stereoscopic image 185 constitutes an effective sensing zone 190 that is used as a reference for placement of a pair of gesture sensors 191 and 192. Therefore, the gesture sensors 191 and 192 can effectively sense the gesture performed by the hand 183 upon the stereoscopic image 185.

Figure 20:
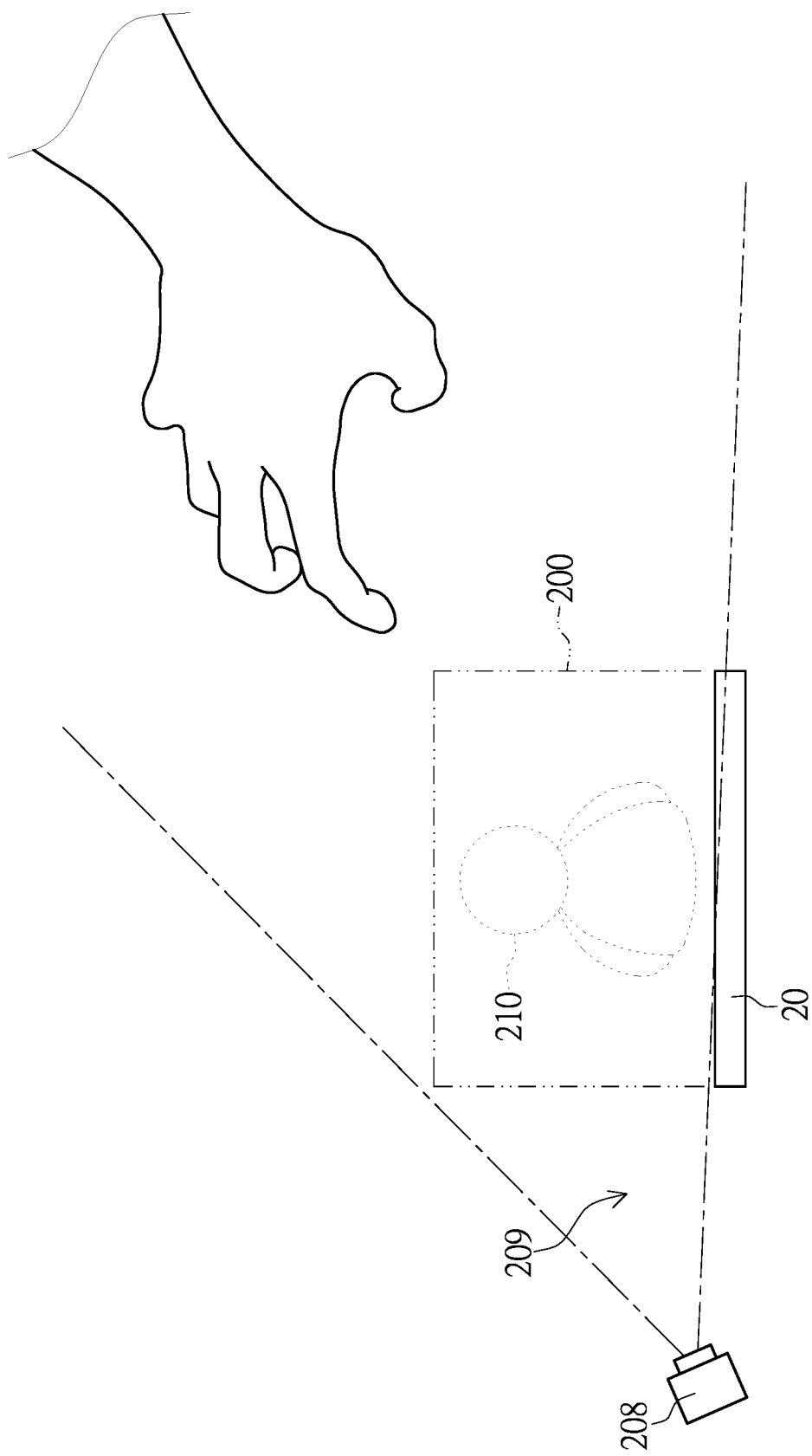

FIG. 20 is a schematic diagram depicting an effective sensing zone established in the stereoscopic image display system according to yet another embodiment of the present disclosure. A gesture sensor 208 is disposed at a side of a stereoscopic image display 20. The gesture sensor 208 has a sensing area 209. The stereoscopic image display 20 displays a stereoscopic image 210 that covers an area. An effective sensing zone 200 is accordingly established to cover the stereoscopic image 210, and performance of a gesture by the user should take place within the effective sensing zone 200.

According to one embodiment of the present disclosure, the stereoscopic image display system can further include a stereoscopic image server that can provide the stereoscopic image data, and the stereoscopic image data is data provided for the stereoscopic image display to display the stereoscopic image. Further, a new stereoscopic image can be obtained according to a previous state of the stereoscopic image and the stereo coordinate variations. The stereoscopic image server then provides new stereoscopic image data.

Figure 21:
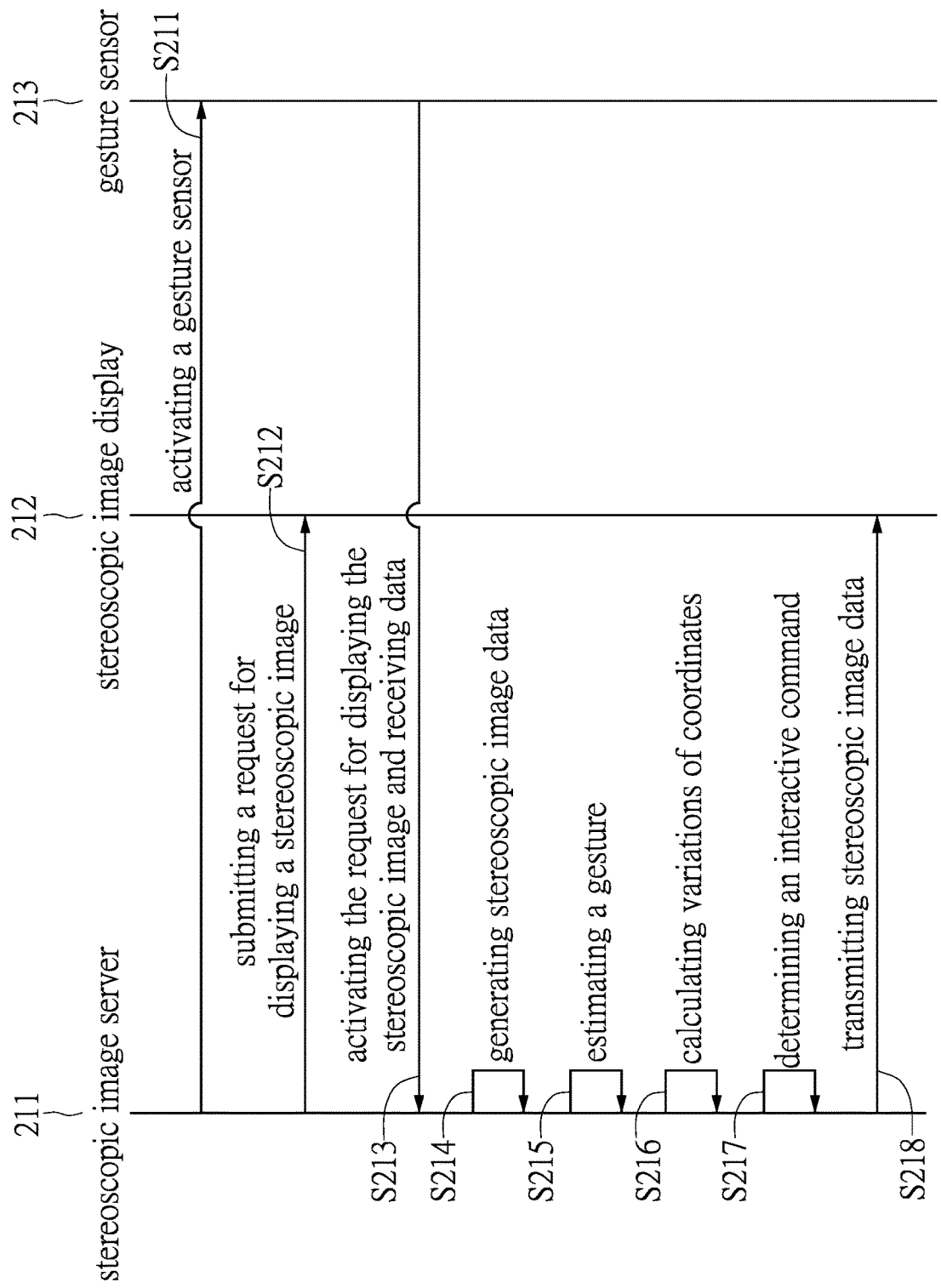
FIG. 21 is a flowchart describing implementation of the method for performing the interactive operation upon the stereoscopic image among a gesture sensor, a stereoscopic image display and a stereoscopic image server according to one embodiment of the present disclosure.

Reference is made to FIG. 21, which is a flowchart describing the method for performing interactive operation upon a stereoscopic image that operates among a gesture sensor 213, a stereoscopic image display 212 and a stereoscopic image server 211. The process shown in FIG. 21 describes an interactive sensing process among the stereoscopic image server 211, the stereoscopic image display 212 and the gesture sensor 213.

In the beginning, according to the present embodiment, the user performs a gesture upon a stereoscopic image above the stereoscopic image display 212. The stereoscopic image server 211 periodically enables the gesture sensor 213 to sense the gesture (step S211), and sends a request for displaying the stereoscopic image to the stereoscopic image display 212 (step S212). The gesture sensor 213 then senses the gesture. In addition to forming stereo coordinate data corresponding to the gesture, a request for a stereoscopic image is generated and sent to the stereoscopic image server 211, so as to obtain the stereoscopic image data (step S213).

When the stereoscopic image server 211 receives the stereo coordinate data with respect to the gesture, the stereoscopic image server 211 obtains a previous state of the stereoscopic image and a previous gesture state (step S214). The stereoscopic image is currently displayed by the stereoscopic image display 212. A current gesture state obtained by the gesture sensor 213 can be compared with the previous gesture state, so that the gesture can be determined through an algorithm for estimating the gesture (step S215).

The stereoscopic image server 211 calculates the stereo coordinate variations caused by the gesture (step S216). After comparing with the stereo coordinate data with respect to the previous gesture state, an interactive command can be determined (step S217). The interactive command can be a click command, swipe command, a rotation command or a zoom command New stereoscopic image data is obtained by querying a database or can be instantly calculated based on the previous state of the stereoscopic image and the stereo coordinate variations caused by the gesture. The new stereoscopic image data is then transmitted to the stereoscopic image display 212 (step S218) for displaying a new stereoscopic image.

In summation, according to the above embodiments of the method for performing the interactive operation upon the stereoscopic image and the stereoscopic image display system, the method allows the user to perform a gesture directly upon the stereoscopic image, and an interactive command is determined accordingly. The system can obtain a new stereoscopic image based on the previous gesture state, the current gesture state and the previous state of the stereoscopic image. The new stereoscopic image is displayed. The user can perform the gesture directly upon the stereoscopic image and interact with the stereoscopic image. According to the states of the gesture, a changing stereoscopic image is displayed. In the method, an interactive effect with the stereoscopic image by gesture can be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for performing interactive operation upon a stereoscopic image, comprising:

displaying, based on stereoscopic image data, the stereoscopic image by a stereoscopic image display; wherein the stereoscopic image is a floating stereoscopic image that is formed by projecting an integrated image displayed on a flat display panel to a space at a distance from the flat display panel through a lens array, and the integrated image is rendered by multiple unit images which are one-by-one imaged through corresponding lenses of the lens array;

sensing a gesture that is performed on the floating stereoscopic image by a gesture sensor so as to obtain a current gesture state, wherein the gesture sensor is used to obtain an image and a depth map of a body part or a pointing device that performs the gesture;

calculating stereo coordinates of multiple critical positions of the gesture according to the image and the depth map;

obtaining a previous state of the stereoscopic image;

obtaining a previous gesture state;

calculating, according to the current gesture state and the previous gesture state, stereo coordinate variations corresponding to the gesture;

obtaining, according to the previous state of the stereoscopic image and the stereo coordinate variations corresponding to the gesture, new stereoscopic image data; and displaying, by the stereoscopic image display, a new stereoscopic image rendered from the new stereoscopic image data;

wherein the gesture sensor obtains depth information of the gesture by a time of a flight detection technology, an acoustic detection technology, a binocular parallax detection technology, or a structured light detection technology, so as to form the depth map.

2. The method according to claim 1, wherein a stereoscopic image server is provided, and the stereoscopic image server is initiated to obtain the previous state of the stereoscopic image and the previous gesture state when stereo coordinate data that reflects the gesture is received; wherein the stereoscopic image server calculates the stereo coordinate variations corresponding to the gesture based on the current gesture state and the previous gesture state, and obtains the new stereoscopic image data according to the previous state of the stereoscopic image and the stereo coordinate variations corresponding to the gesture.

3. The method according to claim 1, wherein the stereo coordinate variations corresponding to the gesture are used to determine an interactive command, and the interactive command is a click command, a swipe command, a rotation command, or a zoom command.

4. The method according to claim 3, wherein the previous state of the stereoscopic image and the stereo coordinate variations corresponding to the gesture are used to calculate gesture-movement data that includes a velocity, an acceleration, a change of position and a change of size of the stereoscopic image within a period of time, by which the stereoscopic image display displays the new stereoscopic image during change.

5. The method according to claim 4, wherein a stereoscopic image server is provided, and the stereoscopic image server is initiated to obtain the previous state of the stereoscopic image and the previous gesture state when stereo coordinate data that reflects the gesture is received; wherein the stereoscopic image server calculates the stereo coordinate variations corresponding to the gesture based on the current gesture state and the previous gesture state, and obtains the new stereoscopic image data according to the previous state of the stereoscopic image and the stereo coordinate variations corresponding to the gesture.

6. The method according to claim 1, wherein the previous gesture state represents stereo coordinates and movement data of multiple critical positions of a previous gesture that are stored in a storage, and the previous state of the stereoscopic image represents stereo coordinates and movement data of a previous stereoscopic image that are stored in the storage.

7. The method according to claim 6, wherein, a stereoscopic image server is provided, and the stereoscopic image server is initiated to obtain the previous state of the stereoscopic image and the previous gesture state when stereo coordinate data that reflects the gesture is received; wherein the stereoscopic image server calculates the stereo coordinate variations corresponding to the gesture based on the current gesture state and the previous gesture state, and obtains the new stereoscopic image data according to the previous state of the stereoscopic image and the stereo coordinate variations corresponding to the gesture.

8. A stereoscopic image display system, comprising:
a stereoscopic image display; and
a gesture sensor connected to the stereoscopic image display;
wherein the stereoscopic image display system executes a method for performing interactive operation upon a stereoscopic image, wherein the method includes:
displaying, based on stereoscopic image data, the stereoscopic image by the stereoscopic image display; wherein the stereoscopic image is a floating stereoscopic image that is formed by projecting an integrated image displayed on a flat display panel to a space at a distance from the flat display panel through a lens array, and the integrated image is rendered by multiple unit images which are one-by-one imaged through corresponding lenses of the lens array;
sensing a gesture that is performed on the floating stereoscopic image by the gesture sensor so as to obtain a current gesture state, wherein the gesture sensor is used to obtain an image and a depth map of a body part or a pointing device that performs the gesture;
calculating stereo coordinates of multiple critical positions of the gesture according to the image and the depth map;
obtaining a previous state of the stereoscopic image;
obtaining a previous gesture state;
calculating, according to the current gesture state and the previous gesture state, stereo coordinate variations corresponding to the gesture;
obtaining, according to the previous state of the stereoscopic image and the stereo coordinate variations corresponding to the gesture, a new stereoscopic image data; and
displaying, by the stereoscopic image display, a new stereoscopic image rendered from the new stereoscopic image data;
wherein the gesture sensor obtains depth information of the gesture by a time of a flight detection technology, an acoustic detection technology, a binocular parallax detection technology, or a structured light detection technology, so as to form the depth map.

9. The stereoscopic image display system according to claim 8, wherein the gesture sensor is disposed at a side of the stereoscopic image display for establishing an effective sensing zone covering the stereoscopic image displayed by the stereoscopic image display, and the gesture is performed within the effective sensing zone.

10. The stereoscopic image display system according to claim 8, wherein the stereo coordinate variations corresponding to the gesture are used to determine an interactive command, and the interactive command is a click command, a swipe command, a rotation command, or a zoom command.

11. The stereoscopic image display system according to claim 10, wherein the previous state of the stereoscopic image and the stereo coordinate variations corresponding to the gesture are used to calculate gesture-movement data that includes a velocity, an acceleration, a change of positions and a change of size of the stereoscopic image within a period of time, by which the stereoscopic image display displays the new stereoscopic image during change.

12. The stereoscopic image display system according to claim 11, wherein the gesture sensor is disposed at a side of the stereoscopic image display for establishing an effective sensing zone covering the stereoscopic image displayed by the stereoscopic image display, and the gesture is performed within the effective sensing zone.

13. The stereoscopic image display system according to claim 8, further comprising a storage, wherein the previous gesture state refers to stereo coordinates and movement data of multiple critical positions of a previous gesture that are stored in the storage, and the previous state of the stereoscopic image refers to stereo coordinates and movement data of a previous stereoscopic image that are stored in the storage.

14. The stereoscopic image display system according to claim 8, further comprising a stereoscopic image server that provides the stereoscopic image data, wherein the stereoscopic image data is data provided for the stereoscopic image display to display the stereoscopic image, and the stereoscopic image server obtains the new stereoscopic image data according to the previous state of the stereoscopic image and the stereo coordinate variations corresponding to the gesture.

15. The stereoscopic image display system according to claim 14, wherein the gesture sensor is disposed at a side of the stereoscopic image display for establishing an effective sensing zone covering the stereoscopic image displayed by the stereoscopic image display, and the gesture is performed within the effective sensing zone.

* * * * *